United States Patent [19]

Ward et al.

[11] 4,313,650
[45] Feb. 2, 1982

[54] APPARATUS FOR CONTROLLING LIGHT AND HEAT TRANSFERENCE FOR GREENHOUSES

[76] Inventors: Jack D. Ward; Douglas G. Ward, both of Garden Valley, Id. 83622

[21] Appl. No.: 163,810

[22] Filed: Jun. 27, 1980

[51] Int. Cl.³ ............................................. G02B 27/00
[52] U.S. Cl. ..................................... 350/263; 47/29; 49/77; 98/110; 160/166 R; 160/176 R
[58] Field of Search ............................ 350/263; 47/29; 160/104, 130, 166 R, 176 R; 49/77; 98/110

[56] References Cited

U.S. PATENT DOCUMENTS

| | | | |
|---|---|---|---|
| 1,419,918 | 6/1922 | Champeau | 350/263 |
| 2,046,601 | 7/1936 | Atkinson | 350/263 X |
| 2,857,634 | 10/1958 | Garbade et al. | 350/263 X |
| 2,991,697 | 7/1961 | Vetere | 350/263 |
| 3,874,114 | 4/1975 | Rowell | 47/29 |
| 4,128,307 | 12/1978 | Badertscher et al. | 350/263 |

FOREIGN PATENT DOCUMENTS

| | | | |
|---|---|---|---|
| 146611 | 9/1949 | Australia | 350/263 |
| 1354676 | 1/1964 | France | 350/263 |

*Primary Examiner*—Richard A. Wintercorn
*Attorney, Agent, or Firm*—Paul F. Horton

[57] ABSTRACT

Apparatus for controlling light and heat transference to and from a greenhouse comprising a plurality of lightweight, rigid, insulative, slats operable to be selectively opened or closed in venetian blind style to selectively lighten or darken any or all portions of a greenhouse. The slats include both bulk and reflective insulation for low thermal conductivity and low emissivity of thermal radiation to retain heat within the greenhouse particularly during cooler periods of the year. The slats are arranged in pitched roof manner and are operable to drain condensed moisture, when closed.

6 Claims, 6 Drawing Figures

APPARATUS FOR CONTROLLING LIGHT AND HEAT TRANSFERENCE FOR GREENHOUSES

BACKGROUND OF THE INVENTION

1. Field of the Invention

This invention relates, in general, to apparatus for controlling light and heat transference, and, in particular, to slat assemblages for controlling light and heat to greenhouses.

2. Description of the Prior Art

The prior art, as typified by the plantbed cover assemblies of N. E. Rowell, U.S. Pat. No. 3,874,114; W. H. Garbade, U.S. Pat. No. 2,857,634; and H. Badertscher, U.S. Pat. No. 4,128,307, includes several devices for controlling the amount of heat and light entering a greenhouse. The Rowell patent illustrates a hinged frame mountable over a plantbed and provided with moveable vanes. To gain access to the plants the framework is simply lifted off a supporting framework. The vanes of the Rowell invention provide shade and also control the amount of moisture entering the plantbed. Use for such devices on conventional greenhouses is prohibited by the size and weight of any such unit.

The Badertscher patent illustrates a lightweight device which is effective for controlling the incidence of heat and light radiation in greenhouses. That invention discloses a plurality of slats lying in a horizontal plane and serving as a light reflective ceiling within a greenhouse. The slats of the Badertscher invention consist of thin reflective aluminum foil which are not self-supporting and which provide only thermal reflective insulation. While providing a significant advance over the prior art, the Badertscher invention does not provide a ceiling of low thermal conductivity and therefore is ineffective in preventing such heat loss. Aluminum foil has a high thermal conductivity, permitting significant heat loss through conduction. Furthermore, the Badertscher invention does not prevent the unwanted dripping of moisture due to condensation.

BRIEF SUMMARY OF THE INVENTION

The present invention comprises apparatus for controlling light and heat transference to and from a greenhouse and includes rotatable slat sets having low thermal conductivity and low emissivity of heat radiation. The slat sets are lightweight and capable of being mounted internally on existing greenhouses. The slats are also so arranged in an inclined manner so as to provide drainage for condensed moisture. A more thorough and comprehensive description may be formed in the appended claims.

It is therefore a primary object of the present invention to provide apparatus for controlling light and heat transference to and from a greenhouse which is lightweight and which provides both bulk and reflective thermal insulation.

More particularly, it is an object of the present invention to make maximum use and control of solar heat.

Another object of the present invention is to make maximum use of available natural light to either increse or decrease natural lighting.

It is also an object of the present invention to provide apparatus that will produce total darkness, when desired, to control blooming time of particular plants within a greenhouse.

An additional object of the present invention is to provide heat and light control apparatus also providing drainage of condensed moisture, when closed.

Additional objects and advantages will become apparent and a more thorough and comprehensive understanding may be had from the following description taken in conjunction with accompanying drawings forming a part of this specification.

Figure 1:
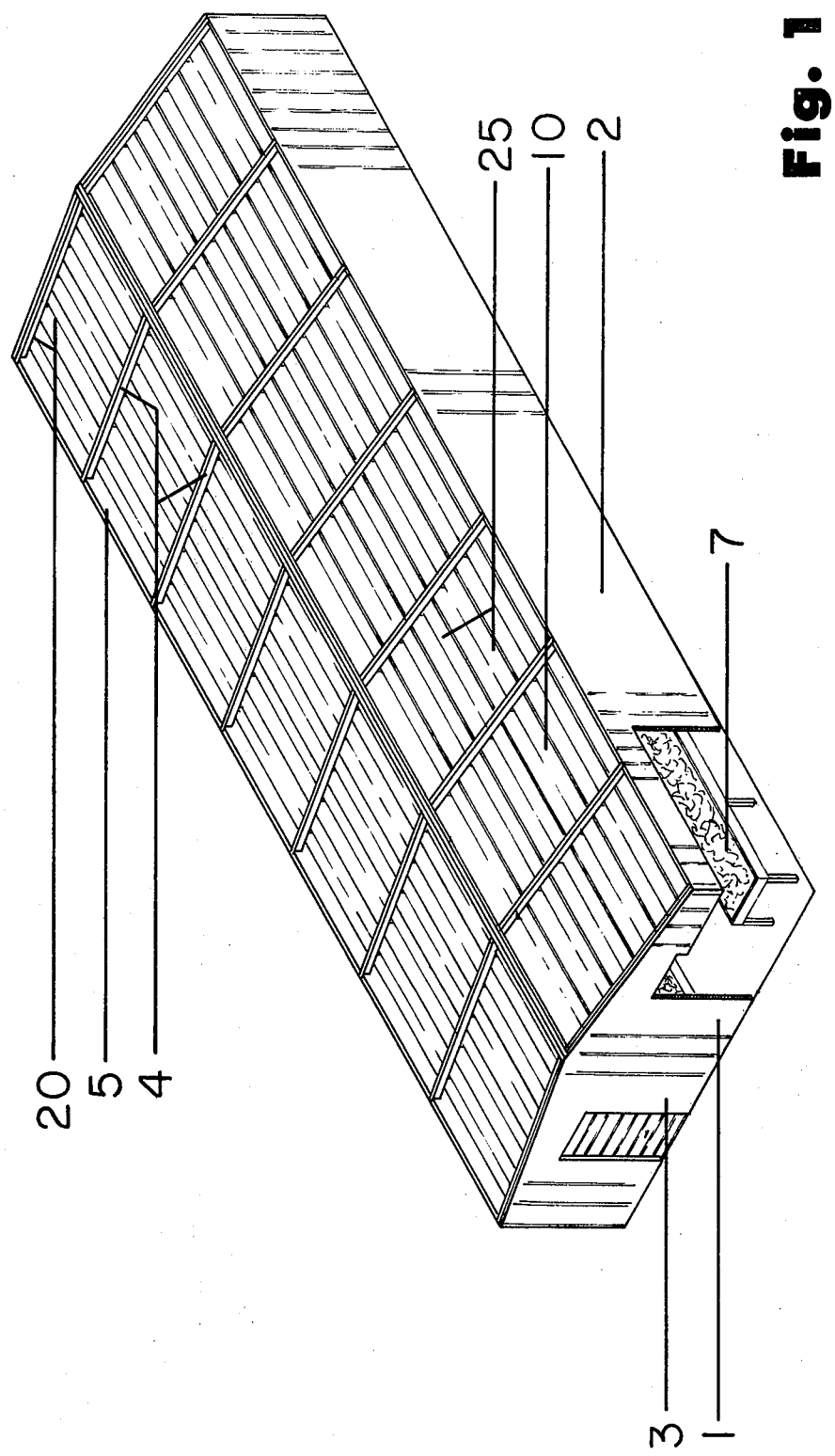
FIG. 1 is a perspective view of a greenhouse showing the arrangement of the rotatable slats of the present invention.

Referring now to the drawings and to FIG. 1, in particular, a conventionally styled greenhouse 1 containing a light and heat transference control device 10, made according to the present invention is shown to advantage. Greenhouse 1 includes standard side walls 2, end walls 3, roof girders 4 and transparent roof paneling 5. Nursery plants 7 are placed upon the floor or upon suitable tables within the greenhouse. Apparatus 10 for controlling light and heat transference to and from greenhouse 1 includes, generally, a plurality of slat sets 20, means for rotating the slats designated generally by the numeral 40 and means 60 for suspending the slat sets from roof girders 4.

Slats 25 of the present invention may be of any suitable size and thickness. Slats having a length of 8 feet, a width of 2 feet and a thickness of 1 inch have been tested and are found to be desirable. Each slat includes a main body of bulk insulating material 27 and a reflective covering represented by the numeral 28 and shown to advantage in FIG. 2. The reflective covering on the end of the slats have been removed in FIG. 2 to show construction. While it is contemplated and within the invention that a loose bulk material such as rock wool, glass wool, or flexible sheet insulators such as Balsam wool or Kapok, with paper, may be used as a filler in a rigid reflective shell, it is preferred that the bulk insulative material be in the form of rigid or semi-rigid sheets of corkboard, solid plastic foam, or the like, for reasons hereinafter explained. It is contemplated that insulators having a thermal conductivity K value of 0.50 or less be used as the main body portion. It has been found that solid plastic polyurethane and polystyrene foams serve as ideal insulators for the main body portion because of their extremely light weight, rigidity, and structural strength.

Although it is necessary to have the reflective covering 28 on the top side of the slat only, it is much preferred that the main body portion be completely encased within the covering. By so doing, moisture is prevented from entering any open pores, the integrity of the thermal conductivity of the bulk insulation is thereby preserved, and the effectiveness of light reflection into the greenhouse and heat reflection back into the greenhouse is thereby enhanced. Reflective covering 28 must have a low emissivity of heat radiation (high reflectivity) and should have a coefficient of absorption of solar radiation below 0.20. Because of its light weight, structural strength, and low coefficient of absorption (0.15), aluminum makes an ideal covering. Thickness of aluminum or other reflective insulative covering used will depend upon the size of slat desired. In the 8'×2'×1" slat heretofore specified and where the main body portion is constructed of rigid plastic foam insulation, it has been found that aluminum foil glued to the plastic foam produces a slat of excellent quality.

Figure 2:
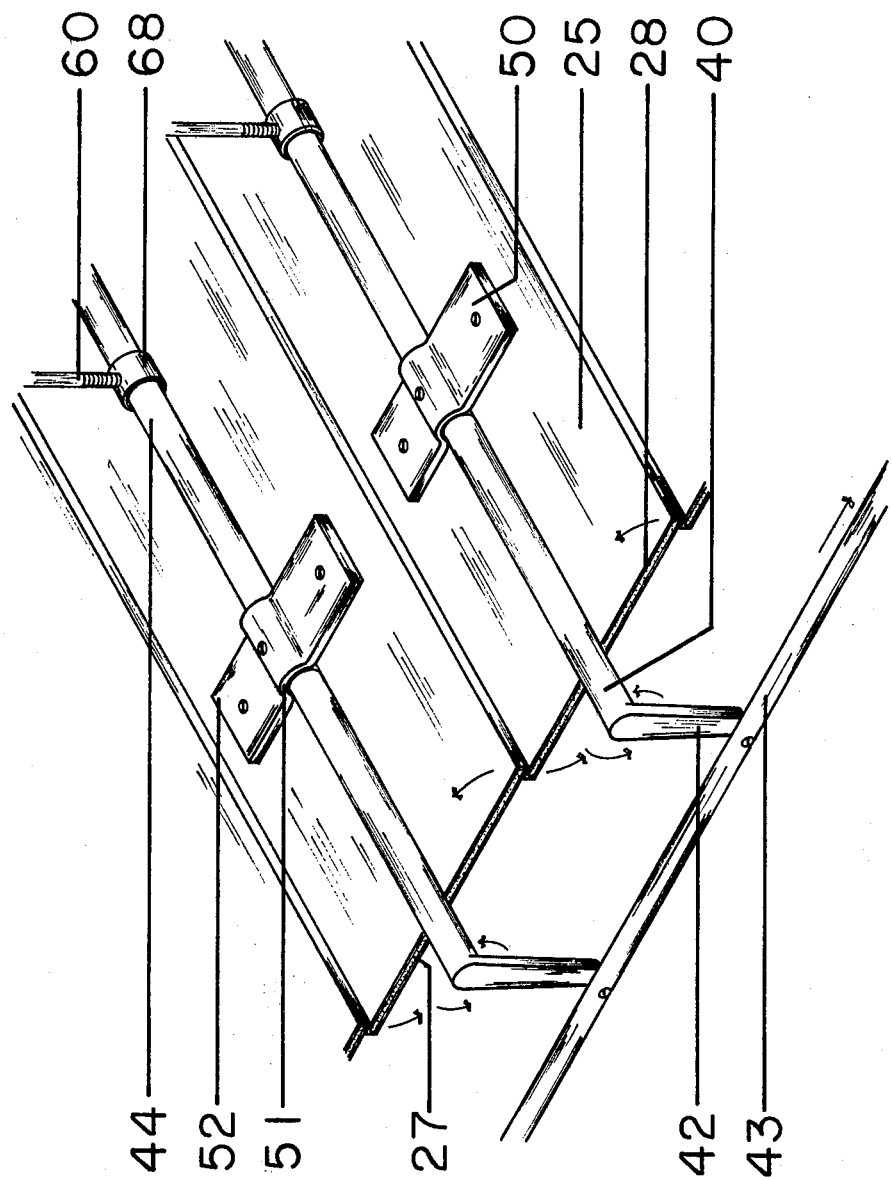
FIG. 2 is a perspective view of adjacent slats showing attachment of the slats to the means for rotation.
Figure 3:
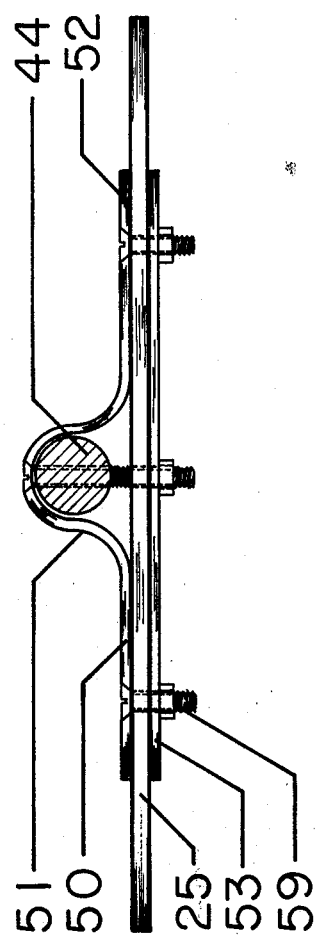
FIG. 3 is an end view of a slat showing attachment plates.
Figure 4:
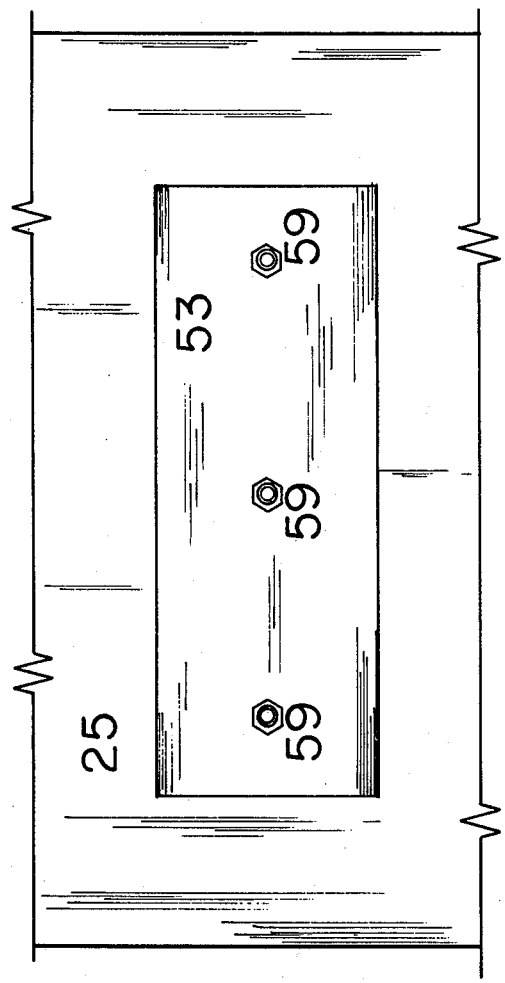
FIG. 4 is a bottom view of a slat.

Each slat 25 is firmly attached to a rod 44, adapted for rotation, for tilting the slat, as will hereinafter be explained. Referring now to FIGS. 2, 3, and 4, it will be seen that each slat 25 is attached to a rod 44 by means of at least two pairs of spaced plates. Each pair of plates includes a top plate 50, having a planar portion 52 for engaging the top of the slat and a semicircular recessed portion 51 for engaging rod 44, and a planar bottom plate 53 for engaging the bottom of the slat. The oppositely disposed plates are held in place relative to rod 44 by fasteners 59 extending through the plates, slat, and rod as shown in the figures. Rods 44 are attached to slats 25 preferably adjacent the longitudinal axis of each slat, also shown in the figures.

Each rod includes at one end a crank arm 42 pivotally connected to an adjustment rod 43, as shown to advantage in FIG. 2. It will be seen that to and fro movement of adjustment rod 43 will cause rotational movement of crank arm 42 and rod 44 which, in turn, rotates slats 25 of a particular slat set 20 for the opening or closing of the slats.

Figure 5:
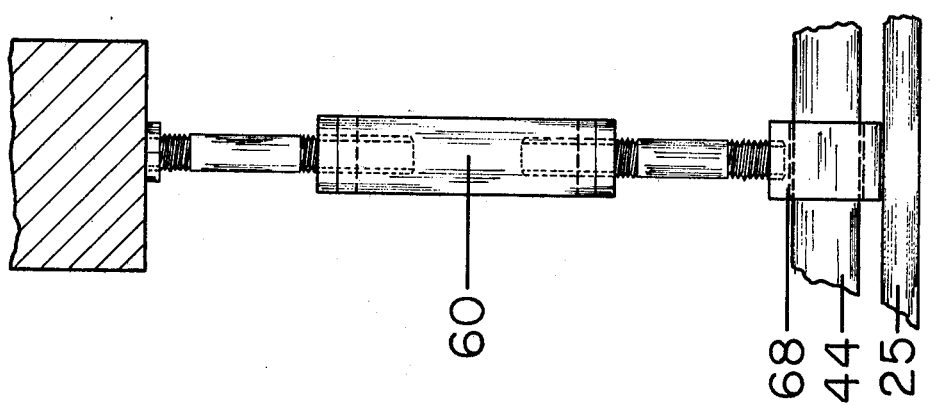
FIG. 5 is a front elevation of the height adjustment control for the slats.
Figure 6:
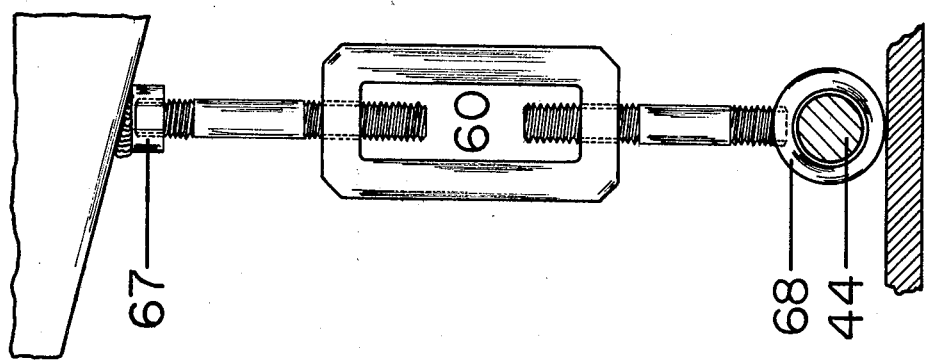
FIG. 6 is a side elevation showing attachment of the turnbuckle to the rotation rod.

Slat sets 20 are suspended from the roof of the greenhouse from existing girders 4, as may be seen in FIGS. 2, 5, and 6, by means of a desired number of turnbuckles 60. Turnbuckles 60 may be fastened to steel girders by nuts 67 welded to the girders and to wooden girders by other suitable fasteners. Turnbuckle 60 includes at its lowermost end a sleeve 68 which encircles rod 44 of selected slats and which is operable to permit rotation of rod 44 within the sleeve. Turnbuckles 60 may be of any desired length and are adjustable to permit the placement of adjacent slat sets in a parallel relationship. Slat sets are suspended from the girders in an inclined position as shown in FIG. 1. Adjacent slats of each set are positioned so that each lower placed slat is overlapped by a higher placed slat, when closed, for a distance of about one inch. This overlapping is effective to seal out the light, to form a continuous insulative barrier of low thermal conductivity, and to form an interior inclined roof-like ceiling capable of draining any moisture which may condense or drip onto the upper surface of the slats. All or selected slat sets 20 may be opened or closed by the operator by a to or fro movement of adjustment rod 43 which is pivotally connected to a series of crank arms 42 which, in turn, are affixed to rods 44 which are rotatably engagable with sleeves 68 of turn buckles 60 which are appropriately fastened to girders 4. As shown in FIG. 2, slats 25 of slat sets 20 are in a closed position with one side of a superiorly placed slat overlapping a side of an adjacent and lower placed slat. In this position the light cannot permeate the slat set, heat and light are reflected upwardly by the reflective aluminum foil, heat contained within the greenhouse cannot readily escape because of the bulk insulation 27 of the slats and by the overlapping seal of adjacent slats, and any moisture which might condense or drop onto the top surface of the slats is drained to the edge of the greenhouse by the rooflike positioning of the slats. Once the adjustment rod is moved in the direction of the arrow the crank arm 42 is rotated to cause a rotational movement of the rod within sleeve 68, the direction also shown by the arrows. Each of the rods 44, being attached to a slat by means of fasteners 59 cause a rotation or tilting of the slats to which they are attached causing the slats to open to admit a desired amount of light. It will be obvious, then, that selected slat sets may be opened or closed to permit varying degrees of light into the greenhouse in selected areas. Those slat sets remaining closed continue to form a bulk insulative barrier to the loss of heat from the greenhouse.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Apparatus for controlling light and heat transference to and from a greenhouse comprising:

a plurality of slat sets suspendable from a greenhouse roof in an inclined position and in parallel relationship with one another to define an internal roof-like structure, each of said slat sets including a plurality of self-supporting slats placed in parallel with one another, each slat adapted to overlap an adjacent and lower placed slat, and each slat including a main body portion of bulk insulation of low thermal conductivity and an outer covering of reflective insulation having low emissivity of thermal radiation;

means for the holding and simultaneous tilting the slats of each set about their longitudinal axis for opening and closing said slats; and means for suspending said slat sets from the roof of a greenhouse.

2. The apparatus as described in claim 1, wherein the main body portion of each slat is made of material having a thermal conductivity less than 0.50.

3. The apparatus as described in claim 1, wherein the main body portion of each slat consists of rigid plastic foam material.

4. The apparatus as described in claim 1, wherein the outer covering of each slat consists of aluminum foil.

5. The apparatus as described in claim 1, wherein said means for suspending said slat sets includes a plurality of turnbuckles, each turnbuckle equipped with roof girder attachment means on its uppermost end and a sleeve operable to engage a rotatable rod on its lowermost end, said turnbuckles operable to raise or lower laterally adjacent slat sets to bring the slat sets into co-planar alignment.

6. Apparatus for controlling light and heat transference to and from a greenhouse comprising:

a first plurality of slat sets suspendable from a greenhouse roof in an inclined position and in parallel relationship, and a second plurality of slat sets also suspendable from the roof in an inclined position and in parallel relationship and at an obtuse angle with said first plurality of slat sets to define an internal rooflike structure, each of said slat sets including a plurality of self-supporting slats placed in parallel with one another, each slat adapted to overlap an adjacent and lower placed slat, and each slat including a main body portion of rigid plastic foam material of low thermal conductivity and an outer covering portion of reflective insulation having low emissivity of thermal radiation; means for the holding and simultaneous tilting of said slats of each set about their longitudinal axis for the opening and closing of said slats; and a plurality of turnbuckles connectable to the roof of a greenhouse for suspending said slat sets from the roof; each turnbuckle equipped with a sleeve operable to engage a rotatable rod, on its lowermost end, said turnbuckles operable to raise or lower laterally adjacent slat sets to bring the slat sets into co-planar alignment.

* * * * *